United States Patent [19]

Farrissey, Jr. et al.

[11] 3,954,684
[45] May 4, 1976

[54] FOAM PROCESS USING TERTIARY AMINE/QUATERNARY AMMONIUM SALT CATALYST

[75] Inventors: William J. Farrissey, Jr., Northford; Abdul-Munim Nashu, Hamden, both of Conn.

[73] Assignee: The Upjohn Company, Kalamazoo, Mich.

[22] Filed: July 9, 1974

[21] Appl. No.: 486,829

[52] U.S. Cl. .................... 260/2.5 AW; 260/2.5 AC; 260/77.5 AC; 252/182; 252/426
[51] Int. Cl.² ................... C08G 18/18; B01J 31/02
[58] Field of Search ............. 260/2.5 AW, 77.5 NC, 260/2.5 AC, 77.5 AC; 252/182, 426

[56] References Cited
UNITED STATES PATENTS

| | | | |
|---|---|---|---|
| 3,487,080 | 12/1969 | MaBui et al. | 260/77.5 NC |
| 3,745,133 | 7/1973 | Communale et al. | 260/2.5 AW |
| 3,849,349 | 11/1974 | Frisch et al. | 260/2.5 AW |

FOREIGN PATENTS OR APPLICATIONS

| | | | |
|---|---|---|---|
| 908,337 | 10/1962 | United Kingdom | 260/2.5 AW |
| 1,155,768 | 6/1969 | United Kingdom | 260/2.5 AW |

*Primary Examiner*—H. S. Cockeram
*Attorney, Agent, or Firm*—James S. Rose; Denis A. Firth

[57] ABSTRACT

A novel catalyst combination for the trimerization of polyisocyanates to polyisocyanurates is disclosed. The catalyst combination comprises (i) a tertiary amine trimerization catalyst, and (ii) a quaternary ammonium salt of an alkanoic acid. The use of this catalyst combination in the preparation of polyisocyanurate foams enables the foaming speeds to be varied from relatively slow to fast in the absence of foam shrinkage. The foams produced in accordance with the present invention are useful in applications calling for relatively fast rise characteristics such as in laminate production.

18 Claims, No Drawings

3,954,684

FOAM PROCESS USING TERTIARY AMINE/QUATERNARY AMMONIUM SALT CATALYST

BACKGROUND OF THE INVENTION

1. Field of the Invention

This invention relates to the preparation of polymer foams and is more particularly concerned with novel catalyst combinations for the trimerization of polyisocyanates to polyisocyanurate foams.

2. Description of the Prior Art

Rigid polyisocyanurate foams having resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion (usually less than 0.5 equivalent per equivalent of polyisocyanate) of a polyol; see for example U.S. Pat. Nos. 3,516,950, 3,580,868, 3,620,986, 3,625,872, 3,635,848, 3,725,319, 3,745,133, G. B. Pat. No. 908,337, and DBP 1,112,285.

The above methods require the foaming process to proceed in conjunction with at least two polymer forming reactions; namely, the isocyanurate formation arising from the homopolymerization of the isocyanate employed, and the minor amount of polyurethane formation arising from the reaction of a polyol with the isocyanate. Difficulties arise, particularly in commercial applications, due to the variation in relative rates of the two polymerization reactions. The polyurethane formation frequently initiates before the trimerization formation thus giving two separate rise steps in the overall foam rise profile.

These difficulties are accentuated in the case of application of polyisocyanurate foams wherein rapid rise characteristics are desirable, such as in spray, or laminate foam systems. The result of simply increasing the concentration of catalysts of the prior art in an attempt to achieve rapid rise characteristics gives rise to poor conversion to polyisocyanurate and foam shrinkage. It has not hitherto been possible to vary the foam rise characteristics over a range of rapid rise times while maintaining an efficient trimerization reaction throughout the range, in the absence of foam shrinkage.

It is an object of the present invention to provide a catalyst combination which is free from the difficulties described hereinbefore, which combination will be set forth in detail hereinbelow. The catalyst combination finds particular utility where a variable range of rapid rise times is desired and thereby accomplished by simple adjustment in catalyst concentration.

SUMMARY OF THE INVENTION

This invention comprises a cocatalyst system for the trimerization of a polyisocyanate which cocatalyst system comprises:

a. from about 3 to about 85 mole percent of a tertiary amine trimerization catalyst; and
b. from about 15 to about 97 mole percent of a lower-alkanoic acid quaternary ammonium salt wherein the quaternary substituents are independently selected from the group consisting of lower-alkyl and aralkyl.

The invention also comprises an improved process for the preparation of flame and heat resistant cellular polymers, in which the major recurring polymer unit is isocyanurate, which process comprises bringing together, in the presence of a blowing agent, a polyisocyanate, a minor amount of a polyol, and a cocatalyst system as recited hereinabove.

The invention also comprises the cellular polymers produced in accordance with the above process.

The term, "lower-alkanoic acid" means an alkanoic acid containing from 1 to 8 carbon atoms inclusive, such as formic, acetic, propionic, butyric, pentanoic, hexanoic, heptanoic, octanoic, and isomeric forms thereof.

The term, "lower-alkyl" means alkyl compounds having from 1 to 8 carbon atoms, inclusive, such as methyl, ethyl, propyl, butyl, pentyl, hexyl, heptyl, octyl, and isomeric forms thereof.

The term "aralkyl" is inclusive of benzyl, p-methylbenzyl, p-ethylbenzyl, β-phenylethyl, naphthylmethyl, benzhydryl, and the like.

DETAILED DESCRIPTION OF THE INVENTION

As discussed above, the need to balance two different reactions, namely that leading to urethane and that leading to isocyanurate, in the preparation of polyisocyanurates makes the choice of catalyst particularly important. This is especially true in the preparation of systems calling for rapid rise characteristics.

It is an object of the present invention to prepare high temperature and fire resistant polyisocyanurate cellular polymers, having rise characteristics making them particularly suitable in the laminate foam art. It is a further object of the present invention to prepare polyisocyanurate foams possessing the aforementioned properties using standard polyurethane foam equipment readily available and known to the art. In still a further object of the present invention it is desired to prepare the foams to achieve the aforementioned objectives without resorting to higher reactant component temperatures than those generally employed in the art. In yet a further object of the present invention it is desired to prepare polyisocyanurate foams that cure rapidly and still possess good thermal insulation properties.

The novel catalyst combinations of the present invention comprise the ingredients set forth above. The cocatalyst components are brought together during or immediately prior to the trimerization reaction of the polyisocyanate. In an optional step the tertiary amine and quaternary salt can be premixed or stored as a mixture.

The components of the catalyst combination of the invention and the concentration ranges of said components are set forth hereinbelow in detail in the form of mole percentages. It is to be understood that the sum total of the individual mole percent concentrations chosen for each component must equal 100 mole percent. It is also to be understood that the concentration of one component can be varied within the specified ranges so long as the appropriate adjustment is made in the remaining component so that the total equals 100 mole percent. This method of indicating the proportions of the two components of the cocatalyst is adopted in defining the parameters of the cocatalyst itself. However, when particular embodiments of the use of the cocatalyst are described hereinbelow, e.g. in the preparation of a polyisocyanurate cellular polymer, the amounts of the components of the cocatalyst will be set forth in absolute terms.

1. The quaternary salt component of the cocatalyst system is advantageously employed in a proportion in the range of from about 15 mole percent to about 97 mole percent of the cocatalyst and, preferably in the range of from about 40 mole percent to about 85 mole percent. The salts are prepared by bringing together the appropriate alkanoic acid as defined hereinabove and represented by the formula

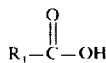

wherein $R_1$ represents hydrogen or alkyl from 1 to 7 carbon atoms, inclusive, with the appropriate quaternary ammonium hydroxide of formula

wherein $R_2$ is lower-alkyl, or aralkyl as defined above. It is understood that when $R_2$ is lower alkyl it can be the same as, or different from $R_1$. Further, the four $R_2$ residues can be the same, or independently selected from differing lower-alkyl, or aralkyl groups as defined hereinabove.

Illustratively, in preparing the quaternary ammonium salts the alkanoic acid is added slowly to a methanolic solution of the quaternary hydroxide which is at a high enough temperature to cause distillation of the methanol but well below the boiling point of the acid being added. Removal of all volatiles, including by-product water, under reduced pressure yields the compound (I) as illustrated by the following equation.

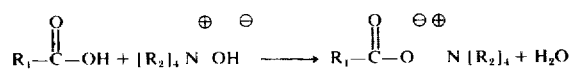

Typical examples of the starting acid include: formic acid, acetic acid, propionic acid, butyric acid, isobutyric acid, valeric acid, caproic acid, heptylic acid, caprylic acid, 2-methylhexanoic acid, 2-ethylhexanoic acid, neopentanoic acid, and the like. Typical examples of the starting quaternary ammonium hydroxide include: tetramethylammonium hydroxide, tetraethylammonium hydroxide, tetrabutylammonium hydroxide, tetraoctylammonium hydroxide, trimethylethylammonium hydroxide, tributylethylammonium hydroxide, triethylbutylammonium hydroxide, benzyltrimethylammonium hydroxide, dibenzyldimethylammonium hydroxide, tribenzylmethylammonium hydroxide and the like. The proportions of reactants employed in preparing the compound (I) can be in a molar ratio of 1:1 but advantageously the carboxylic acid component is present in excess.

A particularly preferred class of salts of formula (I) consists of the following: tetramethylammonium acetate, tetraethylammonium acetate, tetramethylammonium propionate, tetramethylammonium octanoate, tetramethylammonium 2-ethylhexanoate, benzyltrimethylammonium 2-ethylhexanoate, and methyltribenzylammonium 2-ethylhexanoate. A particularly preferred quaternary ammonium salt having the formula (I) is tetramethylammonium 2-ethylhexanoate.

The salts (I) can be isolated in solid form by drying in an oven, or vacuum oven, or by using any standard method for drying solids known to those skilled in the art, and thereafter used in solid form in the cocatalyst system of the present invention. In a preferred embodiment of the invention the salts (I) are employed in the cocatalyst in combination with a diluent. The diluent can be added to the salts (I) after isolation of the latter from the reaction mixture, or preferably the diluent is added to the reaction mixture after all the carboxylic acid has been added and most of the methanol has been distilled overhead. After the diluent has been added the reaction mixture is heated under vacuum to ensure removal of any remaining methanol and water. The resulting solution is then employed in the cocatalyst combination of the invention.

Examples of diluents for the salts (I) include low molecular weight polyols such as ethylene glycol, diethylene glycol, triethylene glycol, dipropylene glycol, dibutylene glycol, tetraethylene glycol, glycerol, the liquid polyethylene glycols such as the polyoxyethylene glycols prepared by the addition of ethylene oxide to water, ethylene glycol or diethylene glycol, and the like; Cellosolve, butyl Cellosolve, Carbitol, methyl Carbitol, butyl Carbitol, and the like; ethanolamine, diethanolamine, triethanolamine; and dipolar aprotic solvents such as dimethylformamide, dimethylacetamide, N-methylpyrrolidone, dimethyl sulfoxide, and the like; and mixtures of any of the aforesaid solvents. A particularly preferred class of diluents consists of ethylene glycol, diethylene glycol, triethylene glycol, polyethylene glycol 400, and mixtures thereof. The concentration of the salt (I) dissolved in the diluent is not critical and can vary from about 20 percent to about 80 percent by weight. When a mixture of diluents is used the proportion by weight of one diluent in the other is advantageously from about 10 to about 90 percent by weight, and preferably from about 25 to about 75 percent by weight.

(2) The tertiary amine component of the cocatalyst combination is advantageously employed in the combination in a proportion in the range of from about 3 mole percent to about 85 mole percent and, preferably from about 15 mole percent to about 60 mole percent. The said tertiary amine component can be any of the tertiary amine trimerization catalyst known in the art and includes those amines set forth in U.S. Pat. No. 3,745,133 in Column 8, lines 1–73 and which are herein incorporated by reference. A particularly preferred class of tertiary amines consists of the following: N,N-dimethylethanolamine, N,N-dimethylcyclohexylamine, N,N-dimethylbenzylamine, N,N,N',N'-tetramethyl-1,3-butanediamine, N,N,N',N'-tetramethylpropanediamine, N-methylmorpholine, N-ethylmorpholine, and N,N',N''-tris(dimethylaminopropyl) hexahydrotriazine. A particularly preferred species of tertiary amine is N,N-dimethylcyclohexylamine.

In an optional embodiment of the cocatalyst combination recited hereinabove there is additionally present a catalytic amount of a monomeric polyepoxide compound. The epoxide compound of the catalyst system is employed in the range of from about 80 weight percent to about 500 weight percent of the total cocatalyst combination of the quaternary ammonium salt and the tertiary amine. The epoxide compound can be any of the polyepoxides set forth in U.S. Pat. No. 3,745,133 in column 5, line 21 to column 7, line 75 which disclosure is incorporated herein by reference. A particularly preferred class of polyepoxide compounds is the novolac resin glycidyl ethers described in U.S. Pat. No. 3,745,133, in column 6, lines 12 to 41.

While the catalyst combination described hereinabove specifically requires the use of at least two different catalyst components in combination, it is to be understood that this does not exclude the presence in the catalyst combination of additional components or agents capable of causing the trimerization of a polyisocyanate provided the components discussed above are present.

The polyols employed in preparing polyisocyanurate foams in accordance with the present invention can include any of the polyols set forth in U.S. Pat. No. 3,745,133, incorporated herein by reference, or any of those known in the art to be useful as a minor component in the preparation of polyisocyanurate foams; see supra. Said polyols can be added separately during the trimerization of the polyisocyanate component, or can be prereacted with the polyisocyanate to form an isocyanate-terminated prepolymer which is subsequently trimerized. The polyols are advantageously employed in the range from about 0.01 equivalent to about 0.5 equivalent per equivalent of isocyanate.

The polyisocyanates employed in the preparation of polyisocyanurate foams in accordance with the present invention can be any of the organic polyisocyanates conventionally employed in the art for this purpose previously; see the art cited supra. Advantageously, in order to obtain foams having exceptionally high heat resistances and structural strength, the polyisocyanates employed in the process of the invention are polymethylene polyphenyl polyisocyanates, particularly those set forth in U.S. Pat. No. 3,745,133. In an optional embodiment the polymethylene polyphenyl polyisocyanate is one having an acidity, expressed as "% hot HCl" of less than about 0.1 percent. Various methods of reducing the acidity to such levels are known in the art. A particularly useful process is that set forth in U.S. Pat. No. 3,793,362. The latter process comprises treating the polyisocyanate with from 0.25 to 1 equivalent of monomeric epoxide for each equivalent of acid present in the polyisocyanate. A particularly preferred polymethylene polyphenyl polyisocyanate is one in which the methylenebis(phenylisocyanate) content is from about 30 percent to about 85 percent by weight.

In carrying out the preparation of polyisocyanurate foams in accordance with the teachings of the invention, the procedures and equipment conventional in the art are employed. The proportions of cocatalyst are so chosen that, for each equivalent of polyisocyanate present in the reaction mixture, there are employed (i) from 0.002 to 0.0315 equivalent, preferably from 0.008 to 0.016 equivalent, of said tertiary amine component, (ii) from 0.0055 to 0.022 equivalent, preferably from 0.01 to 0.019 equivalent of said compound (I), and (iii) when a monomeric polyepoxide compound is optionally present, from 0.025 equivalent to 0.10 equivalent of said polyepoxide compound.

Foaming agents, and other optional additives such as dispersing agents, cell stabilizers, surfactants, flame retardants, and the like, can be employed according to the teachings of the incorporated reference. A particularly preferred class of flame retardant additives are the phosphorus containing flame retardants, such as: tris-(2-chloroethyl)phosphate, tris-(2-chloropropyl)phosphate, tris(2,3-dibromopropyl)phosphate, tris(1,3-dichloroisopropyl)phosphate, and the like.

The cellular products of the invention are particularly suitable for the preparation of foam laminate board material where thermal resistance, low flame spread and low smoke generation on combustion are required. Standard continuous laminating machinery (such as that equipment provided by the Admiral Equipment Corporation, Akron, Ohio) can be employed in preparing the laminate board referred to hereinabove. The polyisocyanurate foams made in accordance with the invention show excellent adhesion to a wide variety of facer materials known to those skilled in the art such as: aluminum foil in various thicknesses, tar paper, Kraft paper, asphalt felt, various types of felt, paper cupstock, transite, polyethylene, polypropylene, polyvinylchloride, fiber glass scrim in aluminum, and the like.

The cellular laminate board stock can be employed as thermal barriers and insulating materials for roof decks and wall insulation in all types of construction and especially industrial buildings. The excellent resistance to distortion and volume change under conditions of elevated temperature, make the laminate board material particularly suitable for use in roof deck application where the material is subject to extremes in temperature range, and other applications where similar environmental conditions occur.

Non-cellular polymers can also be made in accordance with the present invention using standard techniques known to those skilled in the art but employing the cocatalyst combinations of this invention. Solid polymers are obtained by carrying out the trimerization of a polyisocyanate using the same reactants employed in the cellular polymers but in the absence of the blowing agent. The reactants can be cast, moleded, coated, or otherwise deposited by methods known to those skilled in the art, to form a solid polyisocyanurate casting, molding, coating, or other form of solid polyisocyanurate. Such products find use, for example, in high temperature resistant laminates prepared from reinforcing layers of heat resistant fabric such as glass fabric, graphite fabric, and the like, and layers of polyisocyanurate of the invention.

The following preparations and examples describe the manner and process of making and using the invention and set forth the best mode contemplated by the inventors of carrying out the invention but are not to be construed as limiting.

PREPARATION 1

Tetramethylammonium 2-ethylhexanoate

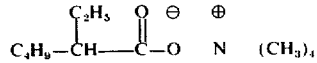

A 5-liter 3 neck flask was fitted with a thermometer, a mechanical stirrer, a distillation assembly and an addition funnel. The flask was charged with 2660 g. of a methanolic solution of tetramethylammonium hydroxide which contained 24 percent hydroxide by weight. This is equivalent to 640 g. (7 moles) of pure quaternary hydroxide. The solution was heated to approximately 80°C with constant stirring and during a period of 2¾ hours, while methanol was distilling overhead, 1150 g. (8.0 moles) of 2-ethylhexanoic acid was added. While the reaction was still fluid, 1002 g. of ethylene glycol was added and during a period of about 24 hours the pressure was slowly decreased while distilling methanol and by-product water overhead at a pot temperature of 60°–70°C until the final vacuum was 2 mm. The desired product was present as approximately a 64 percent solution dissolved in ethylene glycol. This solution of tetramethylammonium 2-ethylhexanoate was used directly as a catalyst component. A crude yield of the salt was obtained when the ethylene glycol was not added but rather the reaction mixture heated until no more overhead distilled off a pot temperature of about 80°C. Excess dioxane was added to the solid residue, cooled, then filtered to obtain the solid product which was dried overnight at 50°C. It was stored in a vacuum desiccator until used as a cocatalyst component.

PREPARATIONS 2 – 7

Using the procedure of Preparation 1 and substituting the carboxylic acids and quaternary ammonium hydroxides set forth in the following Table I, the corresponding salts were obtained as listed therein. In these preparations only a slight excess of acid was used and approximately 140 g. of ethylene glycol was added. The salts are characterized by the percent by weight of solvent (ethylene glycol) content. The solid products were easily obtained as crude yields of salt by simply heating the reaction mixtures in vacuo in the absence of ethylene glycol. Both forms of the salts were employed in catalyst combinations of the present invention.

EXAMPLE 1

This example sets forth a comparison of three cup foams, one of which (Foam A) was not made in accordance with the invention because it lacked a tertiary amine trimerization catalyst component. Foams B and C were prepared in accordance with the present invention. The foams were prepared by thoroughly mixing the components in quart cups using a high speed drill press motor and allowing them to rise freely. The A component included a polymethylene polyphenyl isocyanate containing about 40 percent by weight of methylenebis (phenylisocyanate) the remainder being polymethylene polyphenyl isocyanates of functionality higher than 2.0. The polyisocyanate had been treated with a monomeric epoxy compound in accordance with the method taught in U.S. Pat. No. 3,793,362 to reduce "hot HCl" acidity, below 0.1 percent. In addition the A component also contained tris($\beta$-chloroethyl)phosphate and a surfactant. The B component contained a minor aount of polyol, surfactant and blowing agent, while the C-component contained the catalyst ingredient. The formulations and foam appearances are set forth in Table II. Foam A shrank in comparison to Foams B and C, with the latter two being visibly superior to Foam A. Both Foams B and C had rise charac-

TABLE I

| Prep. | Carboxylic Acid (1.1 mole) | Quaternary Hydroxide (1.0 mole) | Product | Solvent % (by wt.) |
|---|---|---|---|---|
| 2 | acetic | tetramethylammonium | tetramethylammonium acetate | 51 |
| 3 | propionic | tetramethylammonium | tetramethylammonium propionate | 49 |
| 4 | octanoic | tetramethylammonium | tetramethylammonium octanoate | 30 |
| 5 | acetic | tetraethylammonium | tetraethylammonium acetate | 42 |
| 6 | 2-ethylhexanoic | benzyltrimethylammonium | benzyltrimethylammonium 2-ethylhexanoate | 32 |
| 7 | 2-ethylhexanoic | methyltribenzylammonium | methyltribenzylammonium 2-ethylhexanoate | 22 | teristics suitable for laminate formation.

TABLE II

| Foams | A | B | C |
|---|---|---|---|
| Ingredients: | | | |
| Component A: | | | |
| Polyisocyanate | 67 | 67 | 67 |
| Tris($\beta$-chloroethyl) phosphate | 7.5 | 7.5 | 7.5 |
| L-5340[1] | 0.5 | 0.5 | 0.5 |
| Component B: | | | |
| Polyol I[2] | 19.5 | 19.5 | 19.5 |
| DC-193[3] | 0.5 | 0.5 | 0.5 |
| Freon-11-B | 16 | 16 | 16 |
| Component C: | | | |
| Catalyst I[4] | 3 | 3 | 3 |
| N,N',N'' tris(dimethylaminopropyl)hexahydrotriazine | — | 1 | — |
| 2,4,6-tris(dimethylaminomethyl)phenol | — | — | 2 |
| Rise Characteristics(in seconds): | | | |
| Mix | 10 | 7 | 10 |
| Rise | 20 | 9 | 16 |
| Final Rise | 85 | 40 | 55 |
| Tack Free | 120 | 60 | 55 |
| Foam Appearance | foam shrinks poor appearance and slow rise characteristics | superior foam to Foam A better rise characteristics | superior foam to Foam A better rise characteristics |

Footnotes to Table II

[1]L-5340: A rigid foam silicone surfactant supplied by Union Carbide Corporation; see Union Carbide Bulletin F-42172A, October, 1970.

[2]Polyol I: This polyol consists of a blend of polyols in the following proportions: 4.5 parts of a polyol formed by the reaction of 3 moles of ethylene oxide with trimethylolpropane and having an equivalent weight of about 93, with 15 parts of polyester

TABLE II-continued

| Foams | A | B | C |
|---|---|---|---| polyol which is itself a blend of (i) 13.8 parts of the product of esterifying 1 mole of chlorendic anhydride with 1.1 moles of diethylene glycol and 2.5 moles of propylene oxide and (ii) 1.2 parts of diethylene glycol.
²DC-193: A silicone surfactant sold by Dow Corning Corp.; see "Dow Corning 193 Surfactant", Bulletin: 05-146, February, 1966.
³Catalyst I: A solution consisting of 50 percent by weight of tetramethylammonium 2-ethylhexanoate and 50 percent by weight of triethylene glycol.

EXAMPLE 2

This example further sets forth two cup foams made in accordance with the present invention but employing a different quaternary salt and amine mixture from those hereinbefore exemplified. The same prodedure and ingredients as described in Example 1 were employed in the present example except for the change in catalyst components. The formulations for Foams D and E are set forth in Table III. Both foams are characterized by good appearance. The presence of the small amount of N,N-dimethylcyclohexylamine in Foam E over and above the amine already present in Catalyst III provides for a superior foam when compared to Foam D which lacks this amine.

TABLE III

| Foams | D | E |
|---|---|---|
| Ingredients: | | |
| Component A: | | |
| Polyisocyanate | 67 | 67 |
| Tris(β-chloroethyl)phosphate | 7.5 | 7.5 |
| L-5340 | 0.5 | 0.5 |
| Component B: | | |
| Polyol I | 17.5 | 17.5 |
| DC-193 | 0.5 | 0.5 |
| Freon-11-B | 16 | 16 |
| Component C: | | |
| Catalyst II¹ | 0.5 | 0.5 |
| Catalyst III² | 0.5 | 0.4 |
| N,N-dimethylcyclohexylamine | — | 0.1 |
| Rise Characteristics (in seconds): | | |
| Mix | 10 | 10 |
| Rise | 38 | 26 |
| Final Rise | 123 | 100 |
| Tack Free | — | 70 |
| Foam Appearance | Good | Very Good |

Footnotes to Table III
¹Catalyst II: A solution consisting of 33.3 percent by weight of tetramethylammonium acetate dissolved in diethylene glycol.
²Catalyst III: A 50 percent solution of sodium N-(2-hydroxy-5-nonylphenyl)methyl-N-methylglycinate dissolved in diethylene glycol.

EXAMPLE 3

This example sets forth a series of Foams F through J all made in accordance with the present invention. The same procedure and ingredients as described in Example 2 (Foam E) were employed in the present example except for the use of triethylene glycol as the diluent for the tetramethylammonium acetate catalyst component. The formulations and results are set forth in Table IV. It will be seen that final rise times and tack free times gradually decrease in length from Foam F through Foam J. The variation in rise characteristics were attainable without causing shrinkage of the foams. Minor shrinkage was observed in Foam F but did not prevent the formation of good foam.

TABLE IV

| Foams | F | G | H | I | J |
|---|---|---|---|---|---|
| Ingredients: | | | | | |
| Component A: | | | | | |
| Polyisocyanate | 67 | 67 | 67 | 67 | 67 |
| Tris(β-chloroethyl)phosphate | 7.5 | 7.5 | 7.5 | 7.5 | 7.5 |
| L-5340 | 0.5 | 0.5 | 0.5 | 0.5 | 0.5 |
| Component B: | | | | | |
| Polyol I | 17.5 | 19.4 | 19.4 | 17.5 | 17.5 |
| DC-193 | 0.5 | 0.6 | 0.6 | 0.5 | 0.5 |
| Freon-11-B | 16 | 16 | 16 | 16 | 16 |
| Component C: | | | | | |
| Catalyst IV¹ | 0.6 | 0.6 | 0.7 | 0.7 | 1.0 |
| Catalyst III | 0.8 | 0.48 | 0.64 | 0.8 | 0.8 |
| N,N-dimethylcyclohexylamine | 0.2 | 0.12 | 0.16 | 0.2 | 0.2 |
| Rise Characteristics (in seconds): | | | | | |
| Mix | 10 | 10 | 10 | 10 | 10 |
| Rise | 20 | 18 | 16 | 16 | 15 |
| Final Rise | 100 | 77 | 72 | 73 | 65 |
| Tack Free | 180 | 53 | 43 | 48 | 30 |
| Foam Appearance: | minor shrinkage but good foam | no shrinkage very good foam | no shrinkage very good foam | no shrinkage very good foam | no shrinkage very good foam |

Footnotes to Table IV
¹Catalyst IV: A solution consisting of 33.3 percent by weight of tetramethylammonium acetate dissolved in triethylene glycol.

EXAMPLE 4

This example serves to exemplify another embodiment of the present invention. The same ingredients and procedure as described in previous examples were employed except as noted hereinafter. A minor amount of a glycidyl ether of a novolac resin, namely DEN-431 was employed as an adjunct to the catalyst system. The tertiary amine catalyst was N-methylmorpholine and the quaternary salt used was a 36 percent by weight solution of tetramethylammonium 2-ethylhexanoate dissolved in diethylene glycol. The formulation and properties of this Foam K are set forth in Table V. Both the physical properties and the flame and heat resistant properties of Foam K are excellent.

TABLE V

| Foam | K |
|---|---|
| Ingredients: | |
| Component A: | |
| Polyisocyanate | 134 |
| Tris(β-chloroethyl)phosphate | 15 |
| L-5340 | 1 |
| R-11B | 15 |
| Component B: | |
| Polyol I | 35 |
| DEN-431[1] | 8 |
| DC-193 | 1 |
| R-11B | 18.5 |
| Component C: | |
| Catalyst V[2] | 1.12 |
| N-methylmorpholine | 2.0 |
| Rise Characteristics (mins:seconds): | |
| Mix | 0:10 |
| Rise | 0:55 |
| Tack Free | 4:00 |
| Foam Appearance and Properties: | No shrinkage |
| Density, pcf | 1.93 |
| Compressive strength (psi) | |
| ∥ | 30.4 |
| ⊥ | 15.5 |
| Friability (% wt.loss)[3] | 18.0 |
| Oxygen Index (%)[4] | 33.0 |
| Thermal Gravimetric Analysis | |
| 50% wt. loss at (°C) | 600 |

Footnotes to Table V
[1]DEN-431: Dow epoxy novolac resin, viscosity of 76,500 cps. at 25°C, see "D.E.N. Epoxy Novolac Resins,", The Dow Chemical Company, 1967, pgs. 1-2.
[2]Catalyst V: A solution consisting of 36 percent by weight of tetramethylammonium 2-ethylhexanoate dissolved in diethylene glycol.
[3]Friability: Percent weight loss of sample as determined in accordance with ASTM Test Method C-421.
[4]Flammability test conducted according to the ASTM D-2863 procedure and reported as the percent oxygen content required to sustain sample combustion.

We claim:

1. A cocatalyst system for the trimerization of a polyisocyanate which cocatalyst system comprises:
    a. from about 3 to about 85 mole percent of a tertiary amine trimerization catalyst; and
    b. from about 15 to about 97 mole percent of a lower-alkanoic acid quaternary ammonium salt selected from the group consisting of tetramethylammonium acetate, tetraethylammonium acetate, tetramethylammonium propionate, tetramethylammonium octanoate, tetramethylammonium 2-ethylhexanoate, benzyltrimethylammonium 2-ethylhexanoate, and methyltribenzylammonium 2-ethylhexanoate.

2. A cocatalyst according to claim 1 wherein the tertiary amine is N,N-dimethylcyclohexylamine.

3. A cocatalyst according to claim 1 wherein the ammonium salt is tetramethylammonium 2-ethylhexanoate.

4. A cocatalyst according to claim 1 wherein the ammonium salt is tetramethylammonium acetate.

5. A cocatalyst according to claim 1 wherein the ammonium salt is present in the form of a solution containing from about 20 percent to about 80 percent by weight in a diluent.

6. A cocatalyst system for the trimerization of a polyisocyanate which cocatalyst system comprises:
    a. from about 3 to about 85 mole percent of N,N-dimethylcyclohexylamine; and
    b. from about 15 to about 97 mole percent of tetramethylammonium 2-ethylhexanoate.

7. A cocatalyst according to claim 6 wherein the hexanoate is present in the form of a solution containing from about 20 percent to about 80 percent by weight in a diluent.

8. In a process for the preparation of a cellular polymer in which the major recurring polymer unit is isocyanurate which process comprises bringing together in the presence of a blowing agent, a polyisocyanate, a trimerization catalyst, and a minor amount of a polyol, the improvement which comprises employing as the catalyst, a combination of the following ingredients:
    a. from about 0.002 to about 0.0315 equivalent per equivalent of said polyisocyanate of a tertiary amine trimerization catalyst; and
    b. from about 0.0055 to about 0.022 equivalent per equivalent of said polyisocyanate of a lower-alkanoic acid quaternary ammonium salt selected from the group consisting of tetramethylammonium acetate, tetraethylammonium acetate, tetramethylammonium propionate, tetramethylammonium octanoate, tetramethylammonium 2-ethylhexanoate, benzyltrimethylammonium 2-ethylhexanoate, and methyltribenzylammonium 2-ethylhexanoate.

9. The process according to claim 8 wherein said polyisocyanate is polymethylene polyphenyl isocyanate containing about 30 percent to about 85 percent by weight of methylenebis (phenyl isocyanate).

10. The process according to claim 8 wherein a catalytic amount of a monomeric polyepoxide compound is present in the polymer foam forming reaction mixture.

11. The process according to claim 8 wherein the tertiary amine is N,N-dimethylcyclohexylamine.

12. The process according to claim 8 wherein the ammonium salt is tetramethylammonium 2-ethylhexanoate.

13. The process according to claim 8 wherein the ammonium salt is tetramethylammonium acetate.

14. The process according to claim 8 wherein the ammonium salt is present in the form of a solution containing from about 20 percent to about 80 percent by weight in a diluent.

15. In a process for the preparation of a cellular polymer in which the major recurring polymer unit is isocyanurate which process comprises bringing together in the presence of a blowing agent, a polyisocyanate, a trimerization catalyst, and a minor amount of a polyol, the improvement which comprises employing as the catalyst, a combination of the following ingredients:
    a. from about 0.002 to about 0.0315 equivalent per equivalent of said polyisocyanate of N,N-dimethylcyclohexylamine; and
    b. from about 0.0055 to about 0.022 equivalent per equivalent of said polyisocyanate of tetramethylammonium 2-ethylhexanoate.

16. The process according to claim 15 wherein the polyisocyanate is polymethylene polyphenyl isocyanate containing from about 30 percent to about 85 percent by weight of methylenebis (phenyl isocyanate).

17. The process according to claim 15 wherein a catalytic amount of a glycidyl ether of a novolac resin is present in the polymer foam forming reaction mixture.

18. The process according to claim 15 wherein said ammonium salt is present in the form of a solution containing from about 20 percent to about 80 percent by weight in a diluent.

* * * * *